(12) United States Patent
Privitera et al.

(10) Patent No.: US 11,555,102 B2
(45) Date of Patent: *Jan. 17, 2023

(54) RUBBER COMPOUND FOR PORTIONS OF PNEUMATIC TYRES

(71) Applicant: Bridgestone Europe NV/SA, Zavenlem (BE)

(72) Inventors: Davide Privitera, Rome (IT); Giampaolo Chieffi, Rome (IT); Raffaele Di Ronza, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/764,093

(22) PCT Filed: Nov. 19, 2018

(86) PCT No.: PCT/IB2018/059101
§ 371 (c)(1),
(2) Date: May 14, 2020

(87) PCT Pub. No.: WO2019/102337
PCT Pub. Date: May 31, 2019

(65) Prior Publication Data
US 2020/0277472 A1    Sep. 3, 2020

(30) Foreign Application Priority Data
Nov. 22, 2017  (IT) .................. 102017000133496

(51) Int. Cl.
*C08K 3/04*     (2006.01)
*C08K 5/25*     (2006.01)
*C08L 9/00*     (2006.01)
*B60C 1/00*     (2006.01)
*C08L 7/00*     (2006.01)

(52) U.S. Cl.
CPC ............. *C08L 9/00* (2013.01); *B60C 1/00* (2013.01); *B60C 1/0016* (2013.01); *C08K 3/04* (2013.01); *C08K 5/25* (2013.01); *C08L 7/00* (2013.01); *C08K 2201/014* (2013.01)

(58) Field of Classification Search
None
See application file for complete search history.

(56) References Cited

U.S. PATENT DOCUMENTS 5,462,979 A  * 10/1995 Sandstrom ............ B60C 1/0016
                                                  523/438
5,534,569 A  *  7/1996 Etoh .................... C08K 5/25
                                                  524/191
6,191,206 B1 *  2/2001 Detrano ................ B60C 1/0016
                                                  524/492
2009/0114321 A1  5/2009 Nakamura
2011/0196063 A1 *  8/2011 Yonemoto ............... C08K 3/04
                                                  523/156
2013/0180637 A1  7/2013 Hattori et al.
2014/0296413 A1 * 10/2014 Miyazaki ................ B60C 19/08
                                                  524/432
2015/0144243 A1 *  5/2015 Saito ................... B60C 15/0635
                                                  152/541
2016/0075864 A1 *  3/2016 Takeda .................... C08L 15/00
                                                  523/156
2016/0289421 A1  10/2016 Minouchi
2016/0368324 A1 * 12/2016 Miyazaki ................ C08L 9/00
2018/0105675 A1 *  4/2018 Miyasaka .............. B60C 1/0016
2019/0144680 A1 *  5/2019 Mukai ....................... B60C 1/00
                                                  106/476
2019/0177513 A1 *  6/2019 Hamatani ................ C08K 3/36
2021/0347967 A1 * 11/2021 Chieffi ................... C08L 21/00

FOREIGN PATENT DOCUMENTS

EP        1085046 A2      3/2001
EP        2786861 A1     10/2014
EP        2799479 A1     11/2014
EP        2823972 A1      1/2015
KR      22016125842      * 11/2016

OTHER PUBLICATIONS

Nikiel "New Carbon Black Development" Hose Manufacturers Conference Jun. 2007 slides 1-26. (Year: 2007).*
Written Opinion from PCT application No. PCT/IB2018/059101, dated May 2019 (4 pages).
International Search Report from PCT application No. PCT/IB2018/059101, dated May 2019 (4 pages).
Pigment Carbon Blacks—N134 Carbon Black, by Bellium Carbon Chemical Limited, downloaded from https://www.beilum.com/products/70.html in Jul. 2021.
Pigment Carbon Blacks—N550 Carbon Black, by Bellium Carbon Chemical Limited, downloaded from https://www.beilum.com/products/67.html in Jul. 2021.
ASTM D6556 Method, downloaded from https://www.astm.org/Standards/D6556.html in Jul. 2021.

* cited by examiner

*Primary Examiner* — David J Buttner
(74) *Attorney, Agent, or Firm* — Sara Cipollone; Jenny L. Sheaffer

(57) ABSTRACT

A rubber compound for the preparation of portions of pneumatic tyres comprising a cross-linking unsaturated chain polymer base, a filler system and a vulcanization system. The filler system comprises (a) a first carbon black having a surface area less than or equal to 170 m²/gr in a quantity greater than or equal to 25 phr; (b) a second carbon black having a surface area greater than or equal to 250 m²/gr in a quantity such that the ratio between the quantity of the first carbon black and the quantity of the second carbon black is greater than or equal to 3 and less than or equal to 10; (c) a carbon black dispersing agent in a quantity of less than or equal to 1 phr.

20 Claims, No Drawings

RUBBER COMPOUND FOR PORTIONS OF PNEUMATIC TYRES

The present invention is related to a rubber compound comprising a reinforcing filler system such as to ensure low electrical resistance for the same compound without this provoking a reduction in terms of rolling resistance.

In the field of the production of compounds for portions of pneumatic tyres particular attention is given to the possibility of imparting low electrical resistance to the tread portion.

As is known, it is important for pneumatic tyres to have, together with the related road performance characteristics, an electrical resistance value that allows electrostatic charges, that inevitably accumulate on the vehicle, to discharge to the ground, thus avoiding possible passenger accidents. Generally, the limit resistance value that is considered to be acceptable for a pneumatic tyre is $10^{10}$ ohms.

In order to ensure low pneumatic tyre resistance, solutions are known that provide for the insertion within the tread portion of the pneumatic tyre of one or more conductor elements, each of which usually constitutes a conductive compound having a surface that defines a portion of the tread rolling surface. As is known to a person skilled in the art, the presence of such conductor elements results in a series of disadvantages that are due both to possible irregular wear of the tread as a whole, and to the particularly complex preparation of the tread that can, furthermore, impose the use of production means that are different that those that are normally employed.

Another solution may be to increase the amount of carbon black or to increase the surface area thereof. Such a solution, despite ensuring an increase in the conductivity of the compound, nonetheless results in a reduction in rolling resistance.

US2009114321 discloses a pneumatic tire that can maintain processability and tire performance such as rolling resistance or a wet performance of a tire, overcome the problem of non-conductivity by a tread rubber of silica formulation or the like, and sustain conductive performance of a tire over a long period of time.

US2016289421 discloses a production method for a rubber composition, comprising: using an internal mixer to mix/disperse a rubber wet masterbatch containing a carbon black, a hydrazide compound, an antiaging agent, and sulfur, wherein a timing when the hydrazide compound is charged into the internal mixer is not the same timing when the antiaging agent is charged thereinto but the same timing when the component sulfur is charged thereinto.

The need was therefore felt for a solution that would ensure the manufacture of rubber compounds for portions of pneumatic tyres with a lower electrical resistance, without this resulting in a deterioration in terms of rolling resistance or other properties of the same compounds.

The inventors of the present invention have found that a particular combination of carbon black in the presence of a dispersing agent is able to ensure a significant decrease in electrical resistance without in the least resulting in a worsening in terms of rolling resistance.

The object of the present invention is a rubber compound for the preparation of portions of pneumatic tyres comprising a cross-linking unsaturated chain polymer base, a filler system and a vulcanization system; said compound being characterized in that said filler system comprises (a) a first carbon black having a surface area less than or equal to 170 $m^2/gr$ in a quantity greater than or equal to 25 phr; (b) a second carbon black having a surface area greater than or equal to 250 $m^2/gr$ in a quantity such that the ratio between the quantity of said first carbon black and the quantity of said second carbon black is greater than or equal to 3 and less than or equal to 10; (c) a carbon black dispersing agent in a quantity of less than or equal to 1 phr. As used herein, the foregoing surface areas are measured according to a nitrogen adsorption test.

Here and hereinafter, the term "cross-linkable unsaturated chain polymer base" refers to any natural or synthetic non-cross-linked polymer capable of assuming all of the chemical-physical and mechanical characteristics typically assumed by elastomers after cross-linking (vulcanization) with sulfur-based systems.

Here and hereinafter, vulcanization system refers to a complex of ingredients comprising at least sulfur and accelerating compounds, that in the preparation of the compound are added in a final mixing step and have the purpose of promoting the vulcanization of the polymer base once the compound is subjected to a vulcanization temperature.

Preferably, said carbon black dispersing agent is included in the class of aromatic hydrazides.

Preferably, said second carbon black has a surface area greater than or equal to 800 $m^2/gr$. As used herein, the foregoing surface area is measured according to a nitrogen adsorption test.

Preferably, said first carbon black has a surface area less than or equal to 100 $m^2/gr$. As used herein, the foregoing surface area is measured according to a nitrogen adsorption test.

Preferably, the ratio between the quantity of said first carbon black and the quantity of said second carbon black is greater than or equal to 5 and less than or equal to 8.

A further object of the present invention is a portion of a pneumatic tyre manufactured with the compound of the present invention.

A still further object of the present invention is a pneumatic tyre comprising a portion manufactured with the compound, object of the present invention.

The following are non-limiting examples given purely by way of illustration.

EXAMPLES

Nine compounds were prepared seven of which are comparison compounds and two of which are compounds of the invention.

In particular, the first compound (Compound A) constitutes a first comparison example and represents a standard compound used for manufacturing a portion of a casing. The Compound A comprises as a filler a carbon black with a surface area of 50 $m^2/gr$ (falling within the definition of "first carbon black" according to the wording of the annexed claims) whilst not comprising any type of dispersing agent. The second compound (Compound B) constitutes another comparison example and differs from Compound A insofar as it provides for the addition of a further carbon black with a surface area of 150 $m^2/gr$ (falling within the definition of "first carbon black" according to the wording of the annexed claims). The third compound (Compound C) constitutes a further comparison compound and differs from Compound B insofar as it provides for the addition of a dispersing agent. The fourth compound (Compound D) constitutes a further comparison compound and differs from Compound A insofar as it provides for the addition of a further carbon black with a surface area of 300 $m^2/gr$ (falling within the definition of "first carbon black" according to the wording of the annexed claims). The fifth compound (Compound E) constitutes a compound according to the invention and differs from Compound D insofar as it provides for the addition of a dispersing agent. The sixth compound (Compound F) constitutes another comparison compound and differs from Compound A insofar as it provides for the addition of a further carbon black with a surface area of 1000 m²/gr (falling within the definition of "first carbon black" according to the wording of the annexed claims). The seventh compound (Compound G) constitutes a compound according to the invention and differs from Compound F insofar as it provides for the addition of a dispersing agent. The eighth and ninth compounds differ respectively from Compound E and Compound G insofar as they have a different ratio between the quantity of low surface area carbon black and the quantity of high surface area carbon black.

The compounds of the examples were prepared according to a standard procedure, which is not relevant to the purposes of the present invention.

—Preparation of the Compounds—

(1$^{st}$ Mixing Step)

Before the start of the mixing, a mixer with tangential rotors and an internal volume of between 230 and 270 liters was loaded with the cross-linkable polymer base and the carbon black and, when provided for, the dispersing agent, thus reaching a filling factor of 66-72%.

The mixer was operated at a speed of 40-60 revolutions/minute, and the mixture thus formed was discharged once a temperature of 140-160° C. had been reached.

(2$^{nd}$ Mixing Step)

The mixture obtained from the previous step was reworked in a mixer that was operated at a speed of 40-60 revolutions/minute and, thereafter, discharged once a temperature of 130-150° C. had been reached.

(Final Mixing Step)

The vulcanization system was added to the mixture obtained from the previous step, reaching a filling factor of 63-67%.

The mixer was operated at a speed of 20-40 revolutions/minute, and the mixture thus formed was discharged once a temperature of 100-110° C. had been reached.

Table I lists the compositions in phr of the nine compounds described above.

TABLE I

| | A | B | C | D | E | F | G | H | I |
|---|---|---|---|---|---|---|---|---|---|
| NR | | | | | 40 | | | | |
| BR | | | | | 60 | | | | |
| CB N550 | | | | | 35 | | | | |
| CB N134 | — | 20 | 20 | — | — | — | — | — | — |
| CB* | — | — | — | 10 | 10 | — | — | 15 | — |
| CB** | — | — | — | — | — | 5 | 5 | — | 3 |
| Dispersing agent | — | — | 0.6 | — | 0.6 | — | 0.6 | 0.6 | 0.6 |
| CB N550/CB* or CB N550/CB** | | | | 3.5 | 3.5 | 7 | 7 | 2 | 12 |
| Sulfur | | | | | 2.0 | | | | |
| Accelerants | | | | | 2.5 | | | | |
| Antioxidants | | | | | 4.5 | | | | |
| ZnO | | | | | 3.0 | | | | |
| Stearic acid | | | | | 2.0 | | | | |

NR is a 1,4-cis-polyisoprene rubber of natural origin.

BR is a butadiene rubber with a 1,4-cis content of at least 40%.

The acronym N550 denotes a carbon black surface area of 50 m²/gr.

The acronym N134 denotes a carbon black surface area of 150 m²/gr.

CB* denotes a carbon black with a surface area equal to 300 m²/gr.

CB** denotes a carbon black with a surface area equal to 1000 m²/gr.

The dispersing agent used is N'-(1,3-dimethylbutylidene)-3-hydroxy-2-naphthohydrazide (BMH).

The compounds listed in Table I were subjected to a viscosity measurement and, once vulcanized, to a measurement of the electrical resistance, rolling resistance and mechanical properties.

The viscosity values were obtained according to the ASTM 1646 standard.

The rolling resistance values are strictly correlated to the tan δ values measured at 60° C. (the lower the tan δ value at 60° C., the better the resulting rolling resistance), as dynamic mechanical properties according to the ISO 4664 standard.

The mechanical properties were measured in accordance with the ISO 37 standard.

Table II lists the results obtained from the tests described above.

In order to more immediately highlight those advantages deriving from the present invention, the values of Table II are indexed to the comparison compound values (Compound A).

TABLE II

| | A | B | C | D | E | F | G | H | I |
|---|---|---|---|---|---|---|---|---|---|
| Rolling resistance | 100 | 90 | 95 | 95 | 100 | 95 | 100 | 95 | 105 |
| Electrical resistance | $10^{10}$ | $10^6$ | $10^7$ | $10^6$ | $10^6$ | $10^5$ | $10^5$ | $10^6$ | $10^8$ |
| Viscosity | 100 | 130 | 120 | 130 | 120 | 120 | 110 | 130 | 105 |
| TB | 100 | 110 | 108 | 110 | 108 | 105 | 103 | 110 | 102 |
| EB | 100 | 100 | 100 | 100 | 100 | 100 | 100 | 100 | 100 |
| M300 | 100 | 110 | 108 | 110 | 105 | 105 | 103 | 110 | 100 |
| E' (1%) | 100 | 110 | 106 | 110 | 105 | 110 | 105 | 110 | 105 |

From the values listed in Table II, it is clear that only Compounds E and G, which meet the claimed technical characteristics, are able to ensure the sought after low levels of electrical resistance whilst, contemporaneously, maintaining high levels of rolling resistance.

In particular, it is worth noting that:

although Compound C comprises the dispersing agent and a mixture of two carbon blacks with differing surface areas, it is nonetheless unable to prevent a deterioration in the value of rolling resistance insofar as the added carbon black does not meet the claimed conditions;

even though Compounds D and F comprise a mixture of carbon black that satisfies the claimed characteristics, they are nonetheless unable to prevent a deterioration in the value of rolling resistance due to the absence of the dispersing agent.

Finally, Compounds H and I demonstrate that if the ratio between the respective quantities of the two carbon blacks is not as per that claimed, the advantages sought in terms of rolling resistance or electrical resistance cannot be obtained.

The invention claimed is:

1. A tire tread comprising a rubber compound comprising a cross-linking unsaturated chain polymer base, a filler system and a vulcanizing system;

said compound being characterized in that said filler system comprises (a) a first carbon black having a surface area measured according to a nitrogen adsorption test of less than or equal to 170 m$^2$/gr in a quantity greater than or equal to 25 phr; (b) a second carbon black having a surface area measured according to a nitrogen adsorption test of greater than or equal to 250 m$^2$/gr in a quantity such that the ratio between the quantity of said first carbon black and the quantity of said second carbon black is greater than or equal to 3 and less than or equal to 10; (c) a carbon black dispersing agent consisting of N'-(1,3-dimethylbutylidene)-3-hydroxy-2-naphthohydrazide is present in a quantity of more than zero and less than or equal to 1 phr.

2. The tire tread according to claim 1, wherein the rubber compound is characterized in that said second carbon black has a surface area measured according to a nitrogen adsorption test of greater than or equal to 800 m$^2$/gr.

3. The tire tread according to claim 1, wherein the rubber compound is characterized in that said first carbon black has a surface area measured according to a nitrogen adsorption test of greater than or equal to 100 m$^2$/gr.

4. The tire tread according to claim 1, wherein the rubber compound characterized in that the ratio between the quantity of said first carbon black and the quantity of said second carbon black is greater than or equal to 5 and less than or equal to 8.

5. The tire tread according to claim 1 wherein the first carbon black is N550 grade.

6. The tire tread of claim 1, wherein the second carbon black has a surface area measured according to a nitrogen adsorption test of 800 to 1000 m$^2$/gr.

7. The tire tread according to claim 1, wherein the second carbon black has a surface area measured according to a nitrogen adsorption test of 300 to 1000 m$^2$/gr.

8. The tire tread of claim 1, wherein the first carbon black is present in an amount of about 35 phr.

9. The tire tread of claim 1, wherein the second carbon black is present in an amount of about 5 to about 10 phr.

10. The tire tread of claim 8, wherein the second carbon black is present in an amount of about 5 to about 10 phr.

11. Pneumatic tire comprising a tire tread according to claim 1.

12. A tire tread comprising a rubber compound comprising a cross-linking unsaturated chain polymer base, a filler system and a vulcanizing system; said compound being characterized in that said filler system comprises (a) a first carbon black having a surface area measured according to a nitrogen adsorption test of less than or equal to 170 m$^2$/gr in a quantity greater than or equal to 25 phr; (b) a second carbon black having a surface area measured according to a nitrogen adsorption test of greater than or equal to 250 m$^2$/gr in a quantity such that the ratio between the quantity of said first carbon black and the quantity of said second carbon black is greater than or equal to 3 and less than or equal to 10; (c) a carbon black dispersing agent consisting of N'-(1,3-dimethylbutylidene)-3-hydroxy-2-naphthohydrazide in a quantity of about 0.6 phr to 1 phr.

13. The tire tread according to claim 12, wherein the rubber compound according to claim 1 is characterized in that said second carbon black has a surface area measured according to a nitrogen adsorption test of greater than or equal to 800 m$^2$/gr.

14. The tire tread according to claim 12, wherein the rubber compound according to claim 1 is characterized in that said first carbon black has a surface area measured according to a nitrogen adsorption test of greater than or equal to 100 m$^2$/gr.

15. The tire tread according to claim 12, wherein the rubber compound according to claim 1 characterized in that the ratio between the quantity of said first carbon black and the quantity of said second carbon black is greater than or equal to 5 and less than or equal to 8.

16. The tire tread of claim 12, wherein the second carbon black has a surface area measured according to a nitrogen adsorption test of 800 to 1000 m$^2$/gr.

17. The tire tread of claim 12, wherein the second carbon black has a surface area measured according to a nitrogen adsorption test of 300 to 1000 m$^2$/gr.

18. The tire tread of claim 12, wherein the first carbon black is present in an amount of about 35 phr.

19. The tire tread of claim 12, wherein the second carbon black is present in an amount of about 5 to about 10 phr.

20. Pneumatic tire comprising a tire tread according to claim 12.

* * * * *